United States Patent
Roussy et al.

(10) Patent No.: US 6,654,464 B2
(45) Date of Patent: Nov. 25, 2003

(54) CONNECTOR FOR PRINTED CIRCUIT AND EQUIPMENT WHICH INCLUDES IT

(75) Inventors: Pascal Roussy, Betton (FR); Stephane Michel, Montfort sur Meu (FR); Yann Naslain, Rennes (FR); Jean-Marc Le Foulgoc, Chateaubourg (FR); Mickael Rouxel, Rennes (FR)

(73) Assignee: Mitsubishi Electric Telecom Europe, Nanterre (FR)

( * ) Notice: Subject to any disclaimer, the term of this patent is extended or adjusted under 35 U.S.C. 154(b) by 430 days.

(21) Appl. No.: 09/791,798

(22) Filed: Feb. 26, 2001

(65) Prior Publication Data

US 2001/0017917 A1 Aug. 30, 2001

(30) Foreign Application Priority Data

Feb. 24, 2000 (FR) .............................. 00 02344

(51) Int. Cl.[7] ................................ H04M 1/00
(52) U.S. Cl. ........................ 379/433.05; 379/433.03; 379/438
(58) Field of Search .................. 379/433.03, 433.05, 379/438; 439/500, 620

(56) References Cited

U.S. PATENT DOCUMENTS

| | | |
|---|---|---|
| 5,761,299 A | 6/1998 | Patterson et al. |
| 5,836,790 A | 11/1998 | Barnett |
| 6,129,582 A * | 10/2000 | Wilhite et al. ............ 439/500 |

FOREIGN PATENT DOCUMENTS

| | | |
|---|---|---|
| EP | 0 840 396 | 5/1998 |
| JP | 11121116 | 4/1999 |

* cited by examiner

Primary Examiner—Jack Chiang
(74) Attorney, Agent, or Firm—Oblon, Spivak, McClelland, Maier & Neustadt, P.C.

(57) ABSTRACT

A connector for a double-sided, printed circuit board. The connector has a body defining a housing for accommodating a microphone module, first conductors equipped with an area for electrical connection to a complementary connector and with an area for contact with a track on the first face of the board, and second conductors connecting the microphone to the board. The body has a space for accommodating the board, where the space is defined between the electrical connection areas of the first and second conductors. Each contact area of the second conductors is in contact with the second face of the board. The microphone module is arranged, with respect to the space for accommodating the board, on the same side as the areas for making contact between the second conductors and the board.

20 Claims, 3 Drawing Sheets

CONNECTOR FOR PRINTED CIRCUIT AND EQUIPMENT WHICH INCLUDES IT

CROSS-REFERENCE TO RELATED APPLICATION

The present application is related to French patent application number 00 02344, filed on Feb. 24, 2000, which is hereby incorporated by reference.

BACKGROUND OF THE INVENTION

1. Field of the Invention

The present invention relates to a connector designed to accommodate a printed-circuit board and equipment having such a connector.

2. Discussion of the Background

Connectors are used, for example, in mobile telecommunication equipment, such as portable telephones. The connectors are permanently incorporated so that data transfer can be set up with an external information processing unit, such as a microcomputer, or to transfer electrical energy from a source of electrical energy to the equipment coupled to the external unit via the appropriate connector. Such a connector also allows an electrical connection to be made between a microphone in the mobile telecommunication equipment and the latter's printed-circuit board.

U.S. Pat. No. 5,761,299 and U.S. Pat. No. 5,836,790 describe portable telephones including connectors of this type in which the microphone is arranged next to the set of contact terminals allowing an item of auxiliary equipment to be connected. The microphone and the set of terminals are thus aligned in a transverse direction of the telephone, that is to say along the width of the telephone. More precisely, the set of contact terminals and the microphone are arranged side by side along the width of the telephone's printed-circuit board, this board extending along most of the length of the portable telephone. Furthermore, the set of connection terminals and the microphone are arranged on the same side of the printed-circuit board.

The current demands of consumers require that the dimensions of portable telephones be as small as possible. However, the presence in the connector of the microphone placed next to the set of connection terminals imposes minimum transverse dimensions on the portable telephone in the region where the connector is provided (i.e. at the base of the telephone).

SUMMARY OF THE INVENTION

The present invention provides a connector that can be used in a portable telephone and has reduced dimensions.

To this end, the present invention is a connector intended to accommodate a printed circuit board having electrically conductive metal strips on first and second opposite faces, characterized in that the body has a space for accommodating the board, the space being defined between the electrical connection areas of the first and second electrically conductive elements, so that the or each contact area of the or of each second electrically conductive element is in mechanical contact with a metal strip borne or supported by the second face of the board, and in that the microphone module is essentially arranged, with respect to the space for accommodating the board, on the same side as the or each contact area of the or of each second electrically conductive element.

More specifically, the present invention relates to a connector designed to accommodate a printed-circuit board having electrically conductive metal strips on first and second opposite faces. The connector has a body designed to be mounted on the board, and the body has a housing for accommodating a microphone module. The connector has a microphone module accommodated at least in part in the accommodation housing, and the microphone module has a microphone. The connector has at least one first electrically conductive element having, on the one hand, an area for electrical connection with a corresponding electrically conductive element of a complementary connector, and, on the other hand, an area for contact with a metal strip borne by the first face of the board. Furthermore, the connector has at least one second electrically conductive element having, on the one hand, an area for electrical connection with the microphone, and, on the other hand, an area for contact with a metal strip on the board.

According to specific embodiments, the connector has one or more of the following features:

the microphone module is arranged, at least in part, in line with the space for accommodating the board;

the accommodation housing is arranged in the body, so that the accommodation housing extends essentially facing the second face of the board when the board is plugged into the connector;

the or each electrical connection area of the or of each first electrically conductive element is arranged, within the body, in the continuation of the space for accommodating the board;

the or each second electrically conductive element is integrated in the microphone module, and the body has a passage for the or each second electrically conductive element, the passage connecting the housing for accommodating the microphone module to the space for accommodating the board;

the body and the microphone module have complementary means for holding the microphone module in a predetermined position within the accommodation housing;

the complementary means for holding the microphone module in a predetermined position have means for elastically engaging the microphone module in the accommodation housing; and the microphone module has at least one casing which accommodates the microphone and comprises at least one channel for directing sound waves intended for the microphone.

The present invention further provides mobile telecommunication equipment, characterized in that the equipment has at least one casing, at least one printed-circuit board and at least one connector as described above. The board is plugged into the connector, and the casing has an access opening produced opposite the or each electrical connection area of the or of each first electrically conductive element, so that one or each electrically conductive element of a complementary connector is coupled to the first electrically conductive element or to at least some of the first electrically conductive elements of the connector.

According to a specific embodiment, the mobile equipment is a portable telephone.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE PREFERRED EMBODIMENTS

Figure 1:
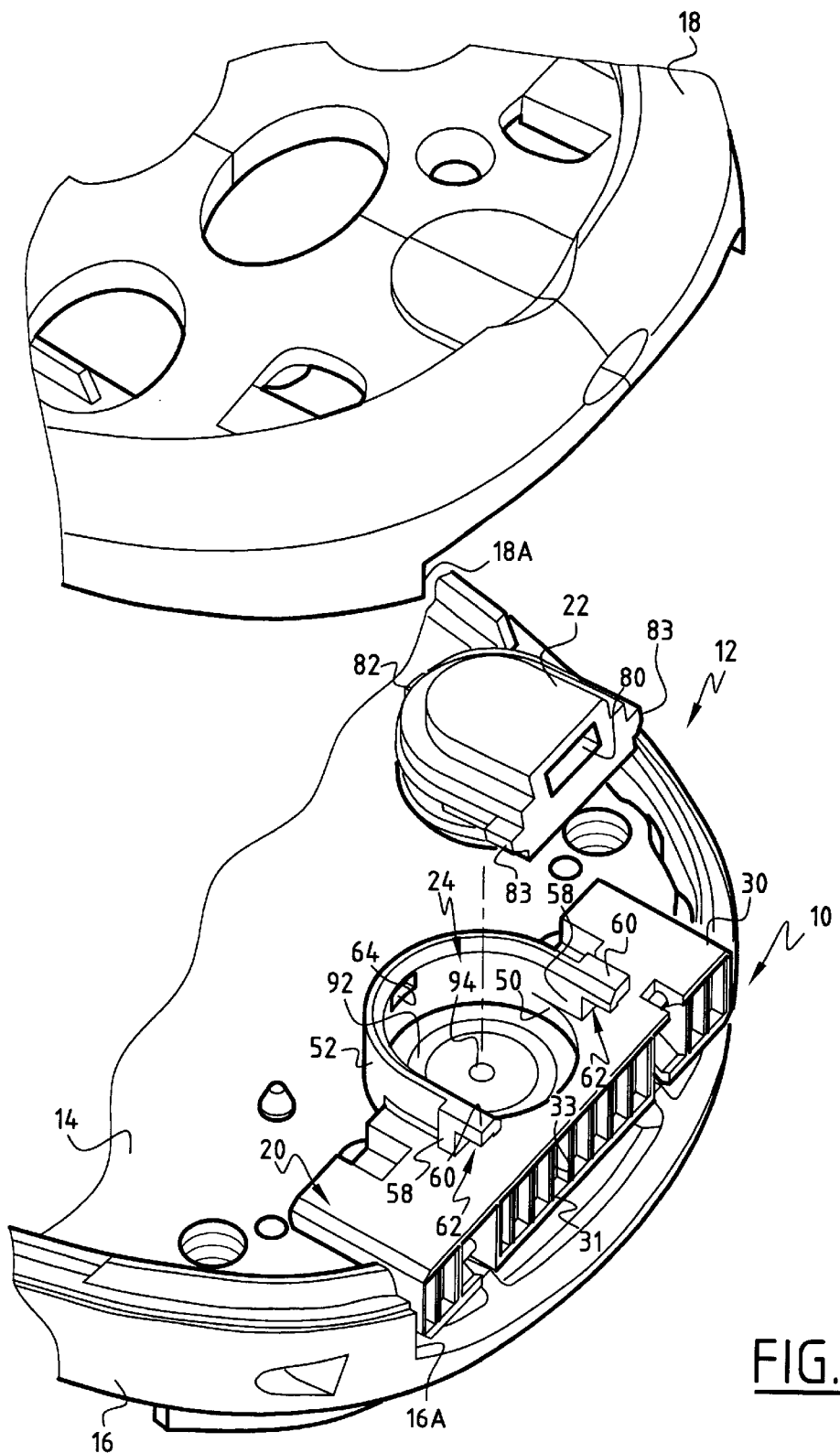
FIG. 1 is a partial view from above in exploded perspective of a portable telephone having a connector according to the invention at a lower end thereof.

FIG. 1 depicts a connector 10 according to the present invention that is inserted into a portable telephone 12. The portable telephone has a printed-circuit board 14 held between a rear half-shell 16 and a front half-shell 18. The two half-shells 16 and 18 delimit an extended outer casing of the telephone. The length of the printed-circuit board extends along the length of the telephone. A keypad is provided on the front half-shell 18.

The connector 10 is provided at the base of the telephone 12, i.e. at a lower end of the telephone opposite the one which has the acoustic transmission element. To this end, the front and rear half-shells have discontinuities 16A, 18A which between them define a passage for accessing the connector. The passage is formed in the lower end face of the casing.

An aperture 19 is made at the base of the front half-shell 18 for sound waves to pass through to a microphone in the telephone.

The connector 10 has a body 20 configured to be mounted on the printed-circuit board 14 at a lower end thereof. The connector 10 also has a microphone module 22 configured to be accommodated in a housing 24 of the body. The module 22 is positioned facing the opening 19.

Figure 2:
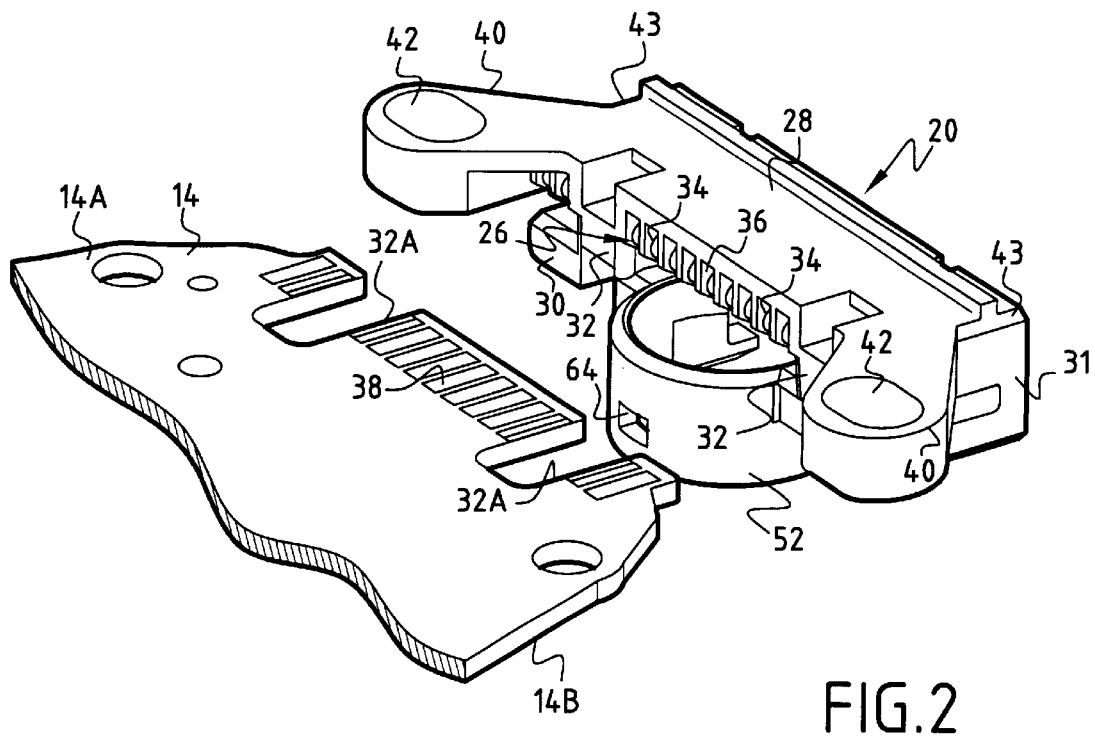
FIG. 2 is a view from below in exploded perspective of the connector and of the end of the printed-circuit board in the portable telephone, where the microphone module is removed.

As depicted in FIG. 2, the body 20 has a slot 26 for accommodating the end of the board 14. The slot 26 allows the connector to enclose the end of the board 14 along its width. The slot 26 is delimited by a base 28 intended to come into contact with a rear face 14A of the board and a covering wall 30 extending parallel to the base 28 and configured to be pressed onto a front face 14B of the board. The base 28 and the covering wall 30 are connected to one another by an end wall 31 configured to extend transversely at the end of the board 14. The end wall partly closes off the slot 26 by extending perpendicular to the base 28 and to the covering wall 30. In addition, the slot 26 is delimited at the sides by pillars 32 connecting the base 28 to the covering wall 30. To allow the pillars 32 to pass, the printed-circuit board 14 is equipped with notches 32A which open out along its lower edge.

The end wall 31 has a set of housings 33 (see FIG. 3) extending parallel to one another. Each housing 33 is contained within the base 28. The housings 33 are distributed along most of the length of the end wall 31. Each of the housings 33 contains an electrically conductive element 34, which can be seen in FIG. 3. Each conductive element 34 is made of a resilient metal blade. The conductive elements 34 continue into parallel grooves 36 (FIG. 2) made on the face of the base 28 delimiting the slot 26 on the inside. Each end of the conductive elements 34, having been accommodated in a corresponding groove 36, is configured to interact with an electrically conductive metal strip 38 produced on the rear face 14A of the printed-circuit board 14. The metal strips 38 are continuations of tracks on the board. The opposite end of each of the conductive elements 34 forms an electrical connection terminal for a corresponding terminal of a complementary connector configured to make electrical connection with another, external item of equipment.

The base 28 is continued laterally on both sides by fixing tabs 40, which can be seen in FIG. 2. Each of the fixing tabs 40 is provided with an opening 42 allowing the passage of a system for fixing to the board, comprising at least one fixing screw. The housing 24 for accommodating the microphone module, which can be seen in FIGS. 1 and 2, is formed facing the conductive elements 34 mounted in the base 28, and is approximately in the connector's central region. It should be noted that, in accordance with an alternative embodiment, the accommodation housing 24 is situated in a region close to one of the lateral outer edges 43 of the connector 10. The accommodation housing 24 is provided on the opposite side of the base 28 to the slot 26. It is produced partly in the covering wall 30.

The accommodation housing 24 is generally of cylindrical shape. The accommodation housing 24 has an axis that extends perpendicularly to the plane of the slot 26. More precisely, the accommodation housing 24 is delimited by a semi-cylindrical wall 50 made in the covering wall 30. The semi-cylindrical wall 50 is continued by a semi-cylindrical skirt 52 which is an integral part of the rest of the body. The semi-cylindrical skirt 52 and wall 50 define a cylindrical space which is open at both ends and opens out, in particular, in the slot 26.

The height of the skirt 52 is greater than the thickness of the covering wall 30. The semi-cylindrical skirt 52 is continued tangentially at two ends thereof by tabs 58 for holding the microphone module 22. The tabs 58 have protrusions 60 oriented towards the end wall 31. The protrusions 60 extend above the covering wall 30 and, with the covering wall 30, delimit notches 62 for accommodating complementary interlocking elements borne or supported by the microphone module 22. In addition, an aperture 64 is made in the inner surface of the semi-cylindrical skirt 52 to allow the microphone module 22 to be retained by elastic engagement.

Figure 3:
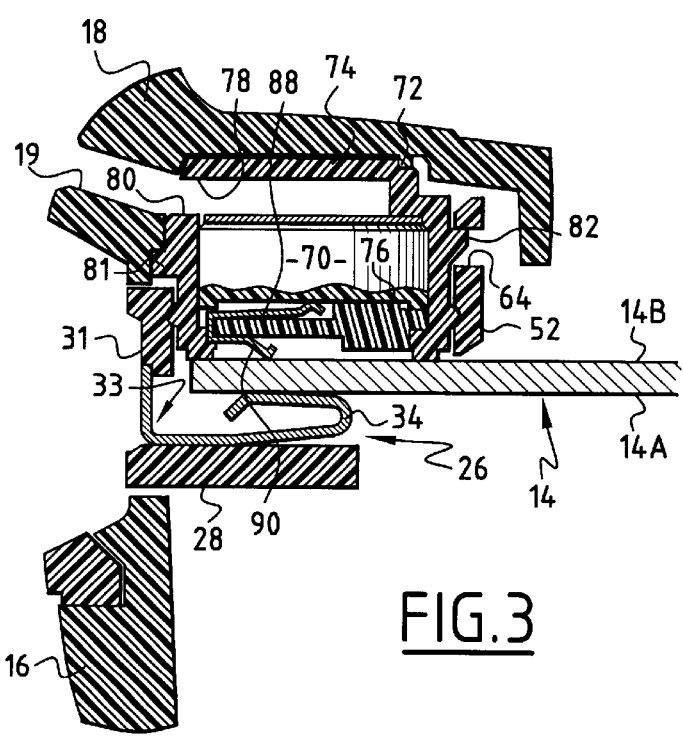
FIG. 3 is a cross-sectional view of the connector according to the invention intended to accommodate a printed-circuit board, where the section is taken in the central plane of the microphone.
Figure 4:
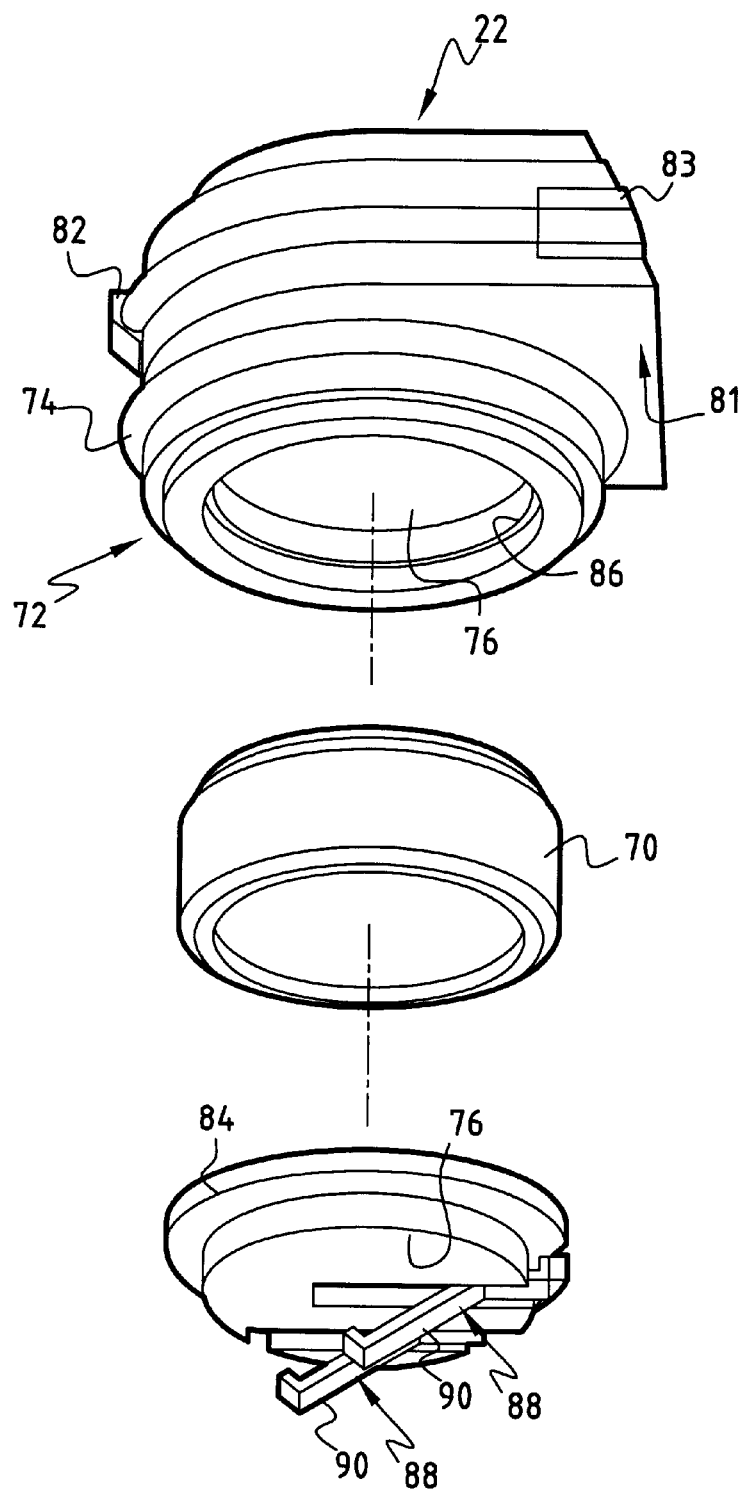
FIG. 4 is a view in exploded perspective of the microphone module intended to be housed in the connector depicted in FIGS. 1 to 3.

The microphone module 22 is shown in detail in FIGS. 3 and 4. The microphone module 22 has a microphone 70 accommodated in a casing 72. The casing 72 has a body 74 defining a housing for accommodating the microphone 70 and a cover 76 for closing off the body. On the inside, the body 74 delimits a cylindrical cavity 76 which retains the microphone. The cavity 67 is continued by a channel 78 for directing sound waves and for routing them to the microphone 70. The channel 78 opens out laterally in a mouth 80 at the surface of the casing.

The shape of the outer surface of the body of the microphone module 22 is generally complementary to that of the accommodation housing 24, thereby providing the body with an essentially cylindrical outer surface. A radial extension 81, in which the channel 78 and the mouth 80 are formed, projects from the cylindrical surface at one end of the body.

On a lateral surface thereof, the body 74 has a protrusion 82 configured to be accommodated in the aperture 64, as well as two protrusions 83, one on each side of the radial extension 81. The protrusions 83 are configured to be accommodated in the notches 62 in the connector body.

Thus, the notches 62 and the aperture 64 interact with the protrusions 83 and the protrusion 82, respectively, so that the microphone module 22 can be held in the desired position.

The cover 76 has the general shape of a disc and, at a periphery thereof, has a collar 84 configured to interact with a peripheral groove 86 produced in the opening in the body 74 in order to fix the cover 76 to one end of the body 74 as a result of elastic engagement. In addition, two electrically conductive elements 88 cross the cover 76 in order to make an electrical connection between the microphone 70 and the printed-circuit board 14. The conductive elements 88 are formed by resilient blades, one branch 90 of which projects outside the microphone module 22. The free end of the branches 90 is bent. As depicted in FIG. 3, the branches 90 are configured to interact with metal strips 92, 94 produced directly on the front face 14B of the printed-circuit board 14 when the microphone module 22 is housed in the connector body 20. The metal strips 92, 94 are connected to tracks on the board 14.

When assembled, the connector body 20 engages at the lower end of the printed-circuit board 14. In this position, the base 28 is essentially facing the rear face 14A of the printed-circuit board, whereas the covering wall 30 is facing the front face 14B. The body is retained by a fixing system comprising screws engaged through the board 14 and the apertures 42. In this position, the end wall 31 is arranged along the width of the board and in its continuation. Thus, the end wall 31 extends along the thickness of the board and continues on either side of the latter. The inherent elasticity of the ends of the conductive elements 34 holds them in contact with the metal strips 38 on the rear face 14A of the printed-circuit board.

As depicted in FIG. 1, the metal strips 92 and 94 produced on the upper face 14B of the printed-circuit board appear at the bottom of the housing 24. The microphone module 22 is engaged in the accommodation housing 24 and is held there by elastic engagement of the protrusions 82 and 83 in the aperture 64 and in the notches 62. In this position, depicted in FIG. 3, the ends of the conductive branches 90 are pressed onto the metal strips 92, 94, thus making electrical connection between the microphone 70 and these metal strips 92, 94, which are themselves connected to tracks on the board 14.

When the microphone module 22 is housed in the connector body 20, the radial extension 81 is pressed onto the upper surface of the covering wall 30 in a position such that the mouth 80 emerges in the opening direction of the apertures 34. When the casing of the telephone is assembled, the mouth 80 of the connector is aligned with the acoustic passage hole 19 made at the lower end of the front half-shell 18.

When the half-shells 16 and 18 are assembled around the board 14 bearing the connector 10, the end wall 31 is accommodated between the discontinuities 16A, 16B made in the lower ends of the half-shells. Thus, the end wall appears through the discontinuities. The conductive elements 34 forming electrical connection terminals are opposite the lower end face of the telephone. The conductive elements 34 are thus made accessible from the lower end of the telephone through the discontinuities.

It will be seen that, with a connector as described above, when the conductive elements 34 of the connector are in contact with one of the faces of the printed-circuit board, while the microphone module 22 extends facing the opposite face of the board, and the connection terminals of the microphone module 22 interact with this opposite face of the board, the lateral dimensions of the connector, and hence the volume, are reduced. Thus, a telephone incorporating such a connector 10 can be miniaturized.

In the previous descriptions, numerous specific details are set forth, such as specific materials, structures, processes, etc., in order to provide a thorough understanding of the present invention. However, as one having ordinary skill in the art would recognize, the present invention can be practiced without resorting to the details specifically set forth. In other instances, well known processing structures have not been described in detail in order not to unnecessarily obscure the present invention.

Numerous modifications and variations of the present invention are possible in light of the above teachings. It is therefore to be understood that, within the scope of the appended claims, the invention may be practiced otherwise than as specifically described herein.

What is claimed is:

1. A connector configured to accommodate a printed-circuit board having electrically conductive metal strips on first and second opposite faces, the connector comprising:

a body configured to be mounted on the board, the body comprising a housing;

a microphone module accommodated at least in part in the housing, the microphone module having a microphone;

at least one first electrically conductive element having an area for electrical connection with a corresponding electrically conductive element of a complementary connector, and an area for contact with a metal strip borne by the first face of the board; and at least one second electrically conductive element having an area for electrical connection with the microphone, and an area for contact with a metal strip on the board, wherein the body has a space for accommodating the board, the space being defined between the electrical connection areas of the at least one first electrically conductive element and the at least one second electrically conductive element, so that the contact area of the at least one second electrically conductive element is in mechanical contact with a metal strip borne by the second face of the board, and wherein the microphone module is arranged, with respect to the space for accommodating the board, on a same side as the contact area of the at least one second electrically conductive element.

2. The connector according to claim 1, wherein the microphone module is arranged, at least in part, in line with the space for accommodating the board.

3. The connector according to claim 2, wherein the housing is arranged in the body, so that the housing extends generally facing the second face of the board when the board is plugged into the connector.

4. The connector according to claim 1, wherein the electrical connection area of the at least one first electrically conductive element is arranged, within the body, in a continuation of the space for accommodating the board.

5. The connector according to claim 2, wherein the electrical connection area of the at least one first electrically conductive element is arranged, within the body, in a continuation of the space for accommodating the board.

6. The connector according to claim 3, wherein the electrical connection area of the at least one first electrically conductive element is arranged, within the body, in a continuation of the space for accommodating the board.

7. The connector according to claim 1, wherein the at least one second electrically conductive element is integrated in the microphone module, and the body has a passage for the at least one second electrically conductive element, the passage connecting the housing for accommodating the microphone module to the space for accommodating the board.

8. The connector according to claim 2, wherein the at least one second electrically conductive element is integrated in the microphone module, and the body has a passage for the at least one second electrically conductive element, the passage connecting the housing for accommodating the microphone module to the space for accommodating the board.

9. The connector according to claim 3, wherein the at least one second electrically conductive element is integrated in the microphone module, and the body has a passage for the at least one second electrically conductive element, the passage connecting the housing for accommodating the microphone module to the space for accommodating the board.

10. The connector according to claim 4, wherein the at least one second electrically conductive element is integrated in the microphone module, and the body has a passage for the at least one second electrically conductive element, the passage connecting the housing for accommodating the microphone module to the space for accommodating the board.

11. The connector according to claim 1, wherein the body and the microphone module have complementary means for holding the microphone module in a predetermined position within the housing.

12. The connector according to claim 2, wherein the body and the microphone module have complementary means for holding the microphone module in a predetermined position within the housing.

13. The connector according to claim 3, wherein the body and the microphone module have complementary means for holding the microphone module in a predetermined position within the housing.

14. The connector according to claim 4, wherein the body and the microphone module have complementary means for holding the microphone module in a predetermined position within the housing.

15. The connector according to claim 11, wherein the complementary means for holding the microphone module in a predetermined position have means for elastically engaging the microphone module in the housing.

16. The connector according to claim 1, wherein the microphone module has at least one casing which accommodates the microphone and comprises at least one channel for directing sound waves intended for the microphone.

17. The connector according to claim 2, wherein the microphone module has at least one casing which accommodates the microphone and comprises at least one channel for directing sound waves intended for the microphone.

18. The connector according to claim 3, wherein the microphone module has at least one casing which accommodates the microphone and comprises at least one channel for directing sound waves intended for the microphone.

19. Mobile telecommunication equipment comprising at least one casing, at least one printed-circuit board and at least one connector according to claim 1, the board being plugged into the connector, and the casing having an access opening opposite the electrical connection area of the at least one first electrically conductive element, so that an electrically conductive element of a complementary connector is coupled to the at least one first electrically conductive element.

20. The mobile telecommunication equipment according to claim 19, wherein said mobile telecommunication equipment is a portable telephone.

* * * * *